US007177731B2

(12) United States Patent
Sandell et al.

(10) Patent No.: US 7,177,731 B2
(45) Date of Patent: Feb. 13, 2007

(54) SYSTEMS AND METHODS FOR HANDLING AIRCRAFT INFORMATION RECEIVED FROM AN OFF-BOARD SOURCE

(75) Inventors: Gordon R. A. Sandell, Bothell, WA (US); John C. Griffin, III, University Place, WA (US); Peter D. Gunn, Bellevue, WA (US); Charles A. Pullen, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 10/798,749

(22) Filed: Mar. 10, 2004

(65) Prior Publication Data

US 2005/0203676 A1 Sep. 15, 2005

(51) Int. Cl.
*G01C 23/00* (2006.01)
*G06F 17/00* (2006.01)

(52) U.S. Cl. ............................ 701/3; 701/14; 340/961; 340/945

(58) Field of Classification Search .................... 701/3, 701/4, 8, 14; 244/180, 194, 75.1, 76 R; 700/1, 700/90; 340/945, 961; 702/108, 127; 73/1.78
See application file for complete search history.

(56) References Cited

U.S. PATENT DOCUMENTS 3,191,147 A 6/1965 Majendie
4,196,474 A 4/1980 Buchanan et al.
4,212,064 A 7/1980 Forsythe
4,247,843 A 1/1981 Miller
4,274,096 A 6/1981 Dennnison (Continued)

FOREIGN PATENT DOCUMENTS

DE 3315386 A 10/1984

(Continued)

OTHER PUBLICATIONS

U.S. Appl. No. 10/746,883, Boorman.

(Continued)

*Primary Examiner*—Y. Beaulieu
(74) *Attorney, Agent, or Firm*—Perkins Coie LLP

(57) ABSTRACT

Systems and computer-implemented methods for handling incoming aircraft operation instructions are disclosed. A method in accordance with one embodiment of the invention includes receiving from a source off-board an aircraft an instruction for a change in a characteristic of the aircraft during operation (e.g., a change in heading, altitude or air speed of the aircraft). The method can further include automatically determining whether or not at least a portion of the instruction is to be implemented once a condition is met. If at least a portion of the instruction is to be implemented once a condition is met, the method can further include automatically carrying out a first course of action. If implementation of at least a portion of the instruction is not predicated upon fulfilling a condition is met, the method can further include automatically carrying out a second course of action different than the first course of action. Carrying out the first course of action can include determining what condition must be met and then presenting an indication to an operator of the aircraft before, after, or both before and after the condition is met.

42 Claims, 7 Drawing Sheets

U.S. PATENT DOCUMENTS

| | | | |
|---|---|---|---|
| 4,325,123 A | 4/1982 | Graham | |
| 4,631,678 A | 12/1986 | Angermuller et al. | |
| 4,792,906 A | 12/1988 | King | |
| 4,860,007 A | 8/1989 | Konicke | |
| 4,899,284 A | 2/1990 | Lewis | |
| 5,050,081 A | 9/1991 | Abbott | |
| 5,070,458 A * | 12/1991 | Gilmore et al. | 701/14 |
| 5,329,277 A | 7/1994 | Dougan et al. | |
| 5,337,982 A | 8/1994 | Sherry | |
| 5,420,582 A | 5/1995 | Kubbat | |
| 5,454,074 A | 9/1995 | Hartel | |
| 5,499,025 A | 3/1996 | Middleton et al. | |
| 5,668,542 A | 9/1997 | Wright | |
| 5,715,163 A | 2/1998 | Bang | |
| 5,739,769 A | 4/1998 | Vladimir | |
| 5,844,503 A | 12/1998 | Riley et al. | |
| 5,875,998 A | 3/1999 | Gleine | |
| 5,940,013 A | 8/1999 | Vladimir et al. | |
| 5,978,715 A | 11/1999 | Briffe | |
| 6,057,786 A | 5/2000 | Briffe | |
| 6,085,129 A | 7/2000 | Schardt | |
| 6,098,014 A | 8/2000 | Kranz | |
| 6,112,141 A | 8/2000 | Briffe | |
| 6,118,385 A | 9/2000 | Leard | |
| 6,188,937 B1 | 2/2001 | Sherry | |
| 6,246,320 B1 | 6/2001 | Monroe | |
| 6,262,720 B1 | 7/2001 | Jeffrey | |
| 6,278,913 B1 | 8/2001 | Jiang | |
| 6,313,759 B1 | 11/2001 | Musland-Sipper | |
| 6,314,366 B1 | 11/2001 | Farmakis et al. | |
| 6,346,892 B1 | 2/2002 | DeMers et al. | |
| 6,362,750 B1 | 3/2002 | Castor | |
| 6,381,519 B1 | 4/2002 | Snyder | |
| 6,389,333 B1 | 5/2002 | Hansman | |
| 6,443,399 B1 | 9/2002 | Yount et al. | |
| 6,542,796 B1 | 4/2003 | Gibbs et al. | |
| 6,556,902 B2 | 4/2003 | Ng Ing | |
| 6,633,810 B1 | 10/2003 | Qureshi et al. | |
| 6,636,786 B2 | 10/2003 | Partel | |
| 6,697,718 B2 | 2/2004 | Le Draoullec et al. | |
| 6,720,891 B2 | 4/2004 | Chen et al. | |
| 6,745,113 B2 | 6/2004 | Griffin | |
| 6,753,891 B1 | 6/2004 | Chohan et al. | |
| 2002/0016654 A1 | 2/2002 | Ing et al. | |
| 2002/0033837 A1 | 3/2002 | Munro | |
| 2003/0058134 A1 | 3/2003 | Sherry | |
| 2003/0132860 A1 | 7/2003 | Feyereisen | |
| 2003/0229426 A1 | 12/2003 | Griffin | |
| 2004/0059474 A1 | 3/2004 | Boorman | |
| 2004/0183697 A1 | 9/2004 | Rogers et al. | |
| 2004/0254691 A1 | 12/2004 | Subelet | |
| 2006/0004496 A1 | 1/2006 | Tucker et al. | |

FOREIGN PATENT DOCUMENTS

| | | |
|---|---|---|
| EP | 0 286 120 | 10/1988 |
| EP | 0 370 640 | 5/1990 |
| EP | 0 489 521 | 6/1992 |
| FR | 2817831 | 6/2002 |
| FR | 2848306 | 6/2004 |
| GB | 888136 | 1/1962 |
| WO | WO-02/24530 | 3/2002 |
| WO | WO-04/027732 | 4/2004 |

OTHER PUBLICATIONS

U.S. Appl. No. 10/746,912, Boorman.
U.S. Appl. No. 10/787,644, Tafs et al.
U.S. Appl. No. 10/798,588, Griffin, III et al.
U.S. Appl. No. 10/814,369, Chen et al.
U.S. Appl. No. 10/814,494, Gunn et al.
U.S. Appl. No. 10/815,034, Crane et al.
777 Flight Deck (1 page); http://www.meriweather.com/777/777_main.html; [Accessed Jan. 28, 2003].
Meriweather's Flight Deck Acronyms & Definitions (4 pages); http://www.meriweather.com/fd/def/html; [Accessed Jun. 3, 2002].
Lindenfeld, Ron, "What is an FMS?", Flight Management Systems (5 pages); http://www.ultranet.com/~marzgold//FAQ-FMS.html; [Accessed Jun. 3, 2002].
Hutchins, Edwin, "The Integrated Mode Management Interface," Department of Cognitive Science, University of California, San Diego, Sep. 17, 1996.
Presentation by Airbus Industries personnel on Jun. 10, 2002 (12 pgs).
Peugeot 406 Handbook, Automobiles Peugeot, Paris, France, May 14, 1998 (pp. 30 and 38).
PCT International Search Report and Written Opinion for PCT/US2005/005236; The Boeing Company; dated Dec. 6, 2005; 8 pgs.
Painter et al., "Decision Support For the General Aviation Pilot," Systems, Man, and Cybernetics, IEEE International Conference on Computational Cybernetics and Simulation, Orlando, FL, Oct. 12-15, 1997, pp. 88-93.

* cited by examiner

SYSTEMS AND METHODS FOR HANDLING AIRCRAFT INFORMATION RECEIVED FROM AN OFF-BOARD SOURCE

TECHNICAL FIELD

The present disclosure relates generally to systems and methods for handling incoming information, including air traffic control clearance information, aboard an aircraft.

BACKGROUND

Modern aircraft typically receive instructions from air traffic control (ATC) or other control authorities during many phases of flight operations, including outbound taxi maneuvers, take-off, climb-out, cruise, descent, landing and inbound taxi maneuvers. The instructions typically include clearances (for example, clearances to land or ascend to a particular altitude) and/or other requests (for example, to tune the aircraft radio to a particular frequency). The instructions can be immediate or conditional. Immediate instructions are intended to be implemented and complied with immediately. Conditional instructions are not to be implemented until a particular condition is met. For example, some conditional instructions are not to be implemented until a specific time period has elapsed, or until the aircraft has reached a specified ground point or altitude.

Conditional instructions have the advantage of providing the aircraft crew with advance notice of a requested change for the path of the aircraft. However, conditional clearances may also pose problems. For example, the crew may not realize that the clearance is conditional and may accordingly implement the instruction prematurely. In other cases, the crew may lose track of when or where the instruction is to be implemented and may accordingly implement the instruction either prematurely or too late. Still further, some instructions include multiple conditional clearances (e.g., clearances that are to be implemented only after multiple conditions are met, or a series of clearances that are to be implemented sequentially as certain conditions are met). Such instructions can be ambiguous and therefore difficult for the crew to understand. These instructions can also be difficult for the crew to track and implement at the correct time and/or location. Some existing aircraft systems provide a warning to the crew if a particular clearance condition is violated. However, such systems may not address the foregoing problems in the most efficient and effective manner.

SUMMARY

The present invention is directed toward systems and methods for handling aircraft information received from an off-board source. A method in accordance with one embodiment of the invention includes receiving from a source off-board an aircraft in instruction for a change in a characteristic of the aircraft during operation. The method can further include automatically determining whether or not at least a portion of the instruction is to be implemented once a condition is met. If at least a portion of the instruction is to be implemented once a condition is met, the method further includes automatically carrying out a first course of action. If implementation of at least a portion of the instruction is not predicated upon fulfilling a condition, the method can include automatically carrying out a second course of action different than the first course of action.

In particular embodiments, carrying out the first course of action can include determining what condition must be met before at least a portion of the instruction is to be implemented, and presenting an indication to an operator of the aircraft before the condition is met, after the condition is met, or both before and after the condition is met. Carrying out the second course of action can include presenting an indication to an operator of the aircraft at least approximately immediately upon determining that the instruction is not to be implemented once a condition is met.

In further embodiments, the instruction can be received from air traffic control and can include a request for changing at least one of a direction, altitude and speed of the aircraft, for example. The instruction can include both conditional and non-conditional portions, or multiple conditions that are to be met sequentially or simultaneously before implementing portions of the instruction.

In still further embodiments, some or all of the foregoing aspects can be carried out by an aircraft system. Accordingly, a system in accordance with one embodiment of the invention can include a receiver portion configured to receive from a source off-board an aircraft an instruction for a change in a characteristic of the aircraft during operation, a discriminator portion configured to automatically determine whether or not the instruction is to be implemented once a condition is met, and a conditional instruction handler configured to automatically carry out a first course of action if the instruction is to be implemented once a condition is met. The system can further include a non-conditional instruction handler configured to automatically carry out a second course of action different than the first course of action if implementation of at least a portion of the instruction is not predicated upon fulfilling a condition.

In yet further embodiments, a computer-implemented method for displaying information corresponding to incoming aircraft operation instructions includes receiving from a source off-board the aircraft an instruction for a change in a characteristic of the aircraft during operation, wherein the instruction is to be implemented once a condition is met. The method can further include displaying at a single display location an at least two-dimensional indication of the location of the aircraft and a location at which the condition is expected to be met. The at least two-dimensional indication can include an indication of the altitude of the aircraft relative to a first axis, and an indication of a distance relative to a second axis transverse to the first axis. The method can further include displaying a textual indication of an upcoming change in a flight path of the aircraft.

DETAILED DESCRIPTION

The following disclosure describes systems and methods for receiving, displaying and implementing instructions received by an aircraft from an off-board source during flight operations. Certain specific details are set forth in the following description and in FIGS. 1–7C to provide a thorough understanding of various embodiments of the invention. Well-known structures, systems and methods often associated with these aircraft systems have not been shown or described in detail to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, including routines executed by a programmable computer (e.g., a flight guidance computer or a computer linked to a flight guidance computer). Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances, hand-held devices (including palm-top computers, wearable computers, cellular or mobile phones, multi-processor systems, processor-based or programmable consumer electronics, network computers, minicomputers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic or optically readable or removable computer disks, as well as distributed electronically over networks. Data structures and transmissions of data particular to aspects of the invention are also encompassed within the scope of the invention.

Figure 1:
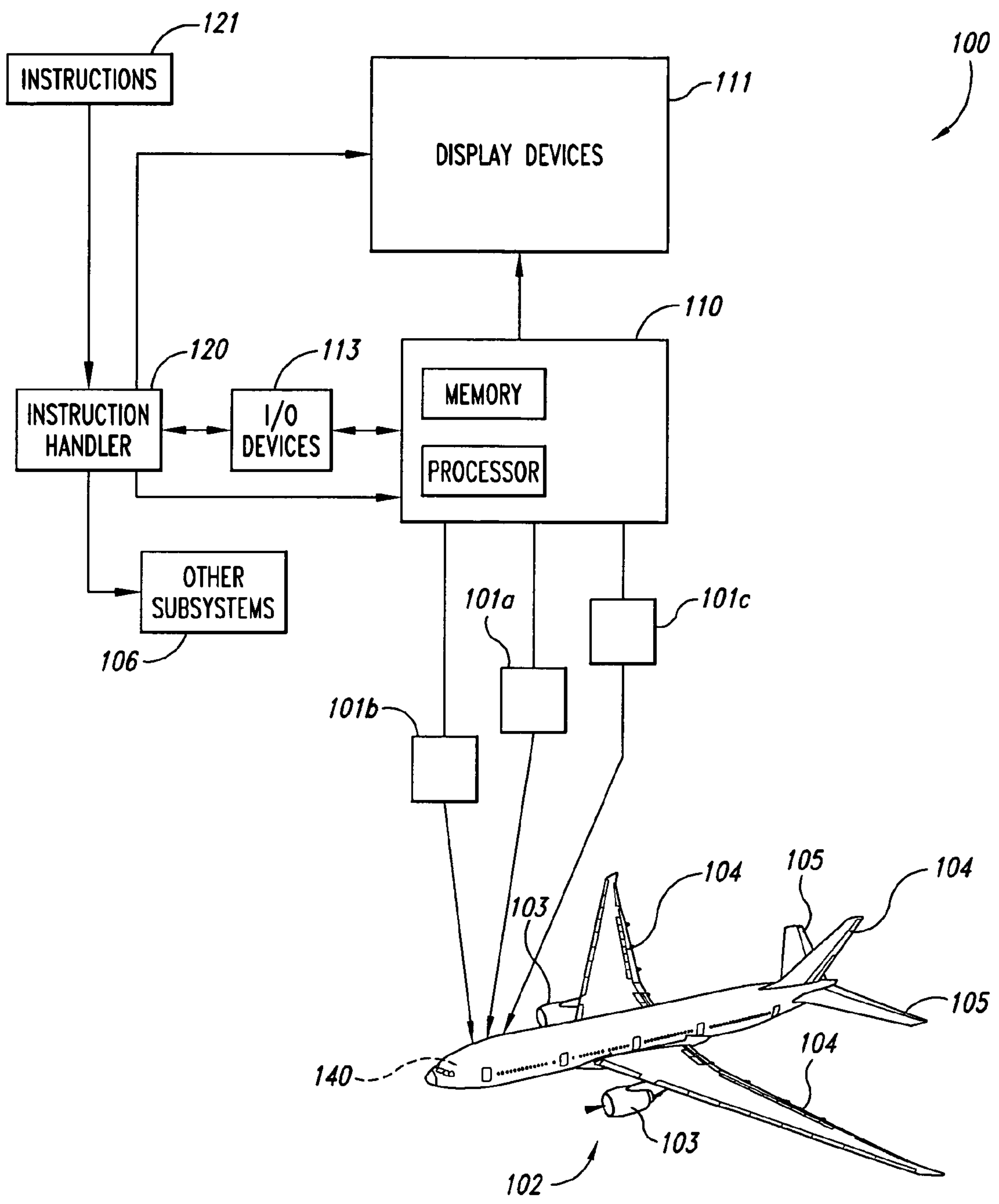
FIG. 1 is a schematic illustration of an aircraft having a system for handling instructions in accordance with an embodiment of the invention.

FIG. 1 is a schematic illustration of an aircraft 102 having a system 100 configured to handle instructions received from off-board the aircraft in accordance with an embodiment of the invention. In one aspect of this embodiment, the system includes an instruction handler 120 that receives instructions 121 from an off-board source. For example, the instruction handler 120 can receive air traffic control information from a ground-based source, either automatically by a data link, or via an aurally received radio transmission that is manually transcribed and entered by the pilot or other operator of the aircraft 102, or automatically transcribed by a voice recognition system. The instruction handler 120 can determine the type of information contained in the instruction, present the information to the operator (e.g., visually via display devices 111 or aurally via synthetic voice messages) and direct instructions to a flight guidance computer 110 or other subsystem 106. The flight guidance computer 110 can include a flight management computer, autoflight computer, autopilot, autothrottle, combinations of the foregoing computers, or other computers that direct and/or control the motion of the aircraft 102. In other embodiments, the instruction handler 120 can be part of the flight guidance computer 110 or another computer, e.g., one or more of the subsystems 106. The instruction handler 120 can handle the received instructions 121 differently depending on whether the instructions are to be implemented immediately (e.g., non-conditional instructions) or after one or more conditions are met (e.g., conditional instructions). When the instructions relate to the aircraft's direction, altitude and/or speed, they are typically directed to the flight guidance computer 110, or the operator can implement the instructions manually. When the instructions relate to other aspects of the operation of the aircraft (e.g., the radio frequency to which the aircraft radios should be tuned), the instruction handler 120 directs the instructions to the other subsystems 106, or the operator can implement the instructions manually. In any of these contexts, the instructions can include a requested change in one or more characteristics of the aircraft.

The flight guidance computer 110 can be linked to one or more aircraft control systems 101, shown in FIG. 1 as a lateral motion or roll control system 101*a*, a vertical motion or pitch control system 101*b*, and an air speed or engine control system/autothrottle 101*c*. The flight guidance computer 110 directs the operation of the control systems 101 (based on inputs from the instruction handler 120) either automatically or by providing guidance cues to the operator who then manually controls the aircraft 102.

The flight guidance computer 110 can include a memory and a processor and can be linked to the display devices 111, I/O devices 113 and/or other computers of the system 100. The I/O devices 113 and the display devices 111 are housed in a flight deck 140 of the aircraft 102 for access by the pilot or other operator. When the instructions 121 are not received by the instruction handler automatically (e.g., via a data link), the operator can provide instructions to the instruction handler 120 via the I/O devices 113. Further details of the instruction handler 120 and associated methods for its operation are described below.

Figure 2:
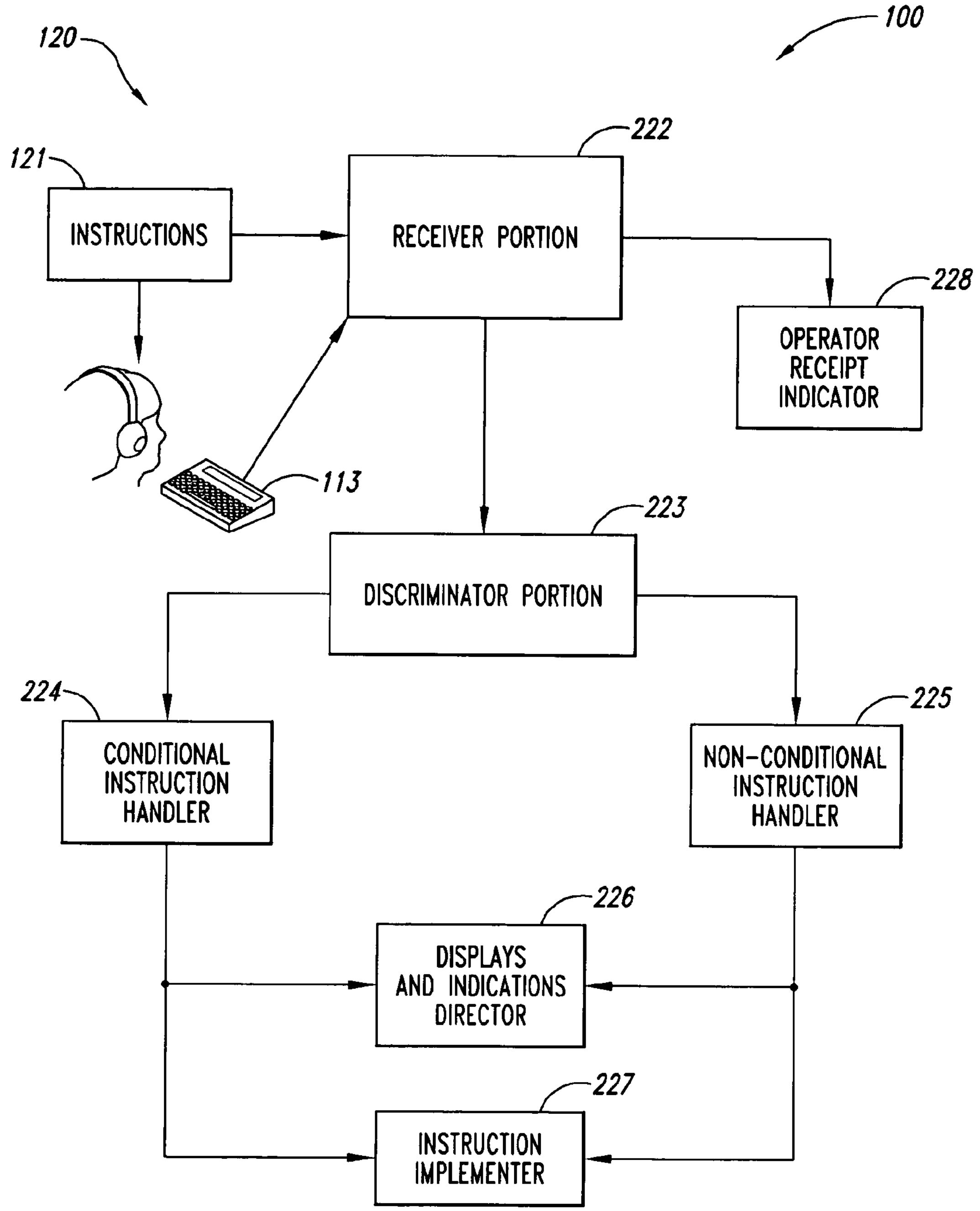
FIG. 2 is a block diagram illustrating features of an embodiment of the system shown in FIG. 1.

FIG. 2 is a block diagram illustrating components of the instruction handler 120 in accordance with an embodiment of the invention. Some or all of these components can include computer-based hardware, software, memories processors and/or other computer-readable media. The instruction handler 120 can include a receiver portion 222 that receives the instructions 121. As described above, the instructions 121 can be received automatically, for example, via a data link, or the instructions 121 can be received when the operator obtains the instructions 121 from air traffic control (ATC) via a radio headset, and then manually inputs the instructions 121 via the I/O devices 113 (which can include a computer keyboard). In other embodiments, the receiver portion 222 can receive voice commands and automatically convert the voice commands to another format (e.g., a digital format). An operator receipt indicator 228 coupled to the receiver portion 222 provides an indication to the operator and/or to the source of the instructions 121 that the instructions 121 have been received. The instructions 121 can then be passed to a discriminator portion 223.

The discriminator portion 223 can identify whether the instructions 121 are to be implemented immediately or after a condition has been met. If the instructions 121 are to be implemented immediately, control can pass to a non-conditional instruction handler 225. If the instructions 121 are to be implemented only when a condition is first met, control can pass to a conditional instruction handler 224. The conditional instruction handler 224 and the non-conditional instruction handier 225 can each handle instructions in a different manner to provide the operator with more accurate information and/or to reduce the likelihood for mis-implementing the instructions. Both the conditional instruction handler 224 and the non-conditional instruction handler 225 can direct displays and indications and/or annunciations to the operator via a displays and indications director 226, and can implement the instructions via an instruction implementor 227. Further details of particular methods by which the instruction handler 120 operates are described below with reference to FIG. 3.

Figure 3:
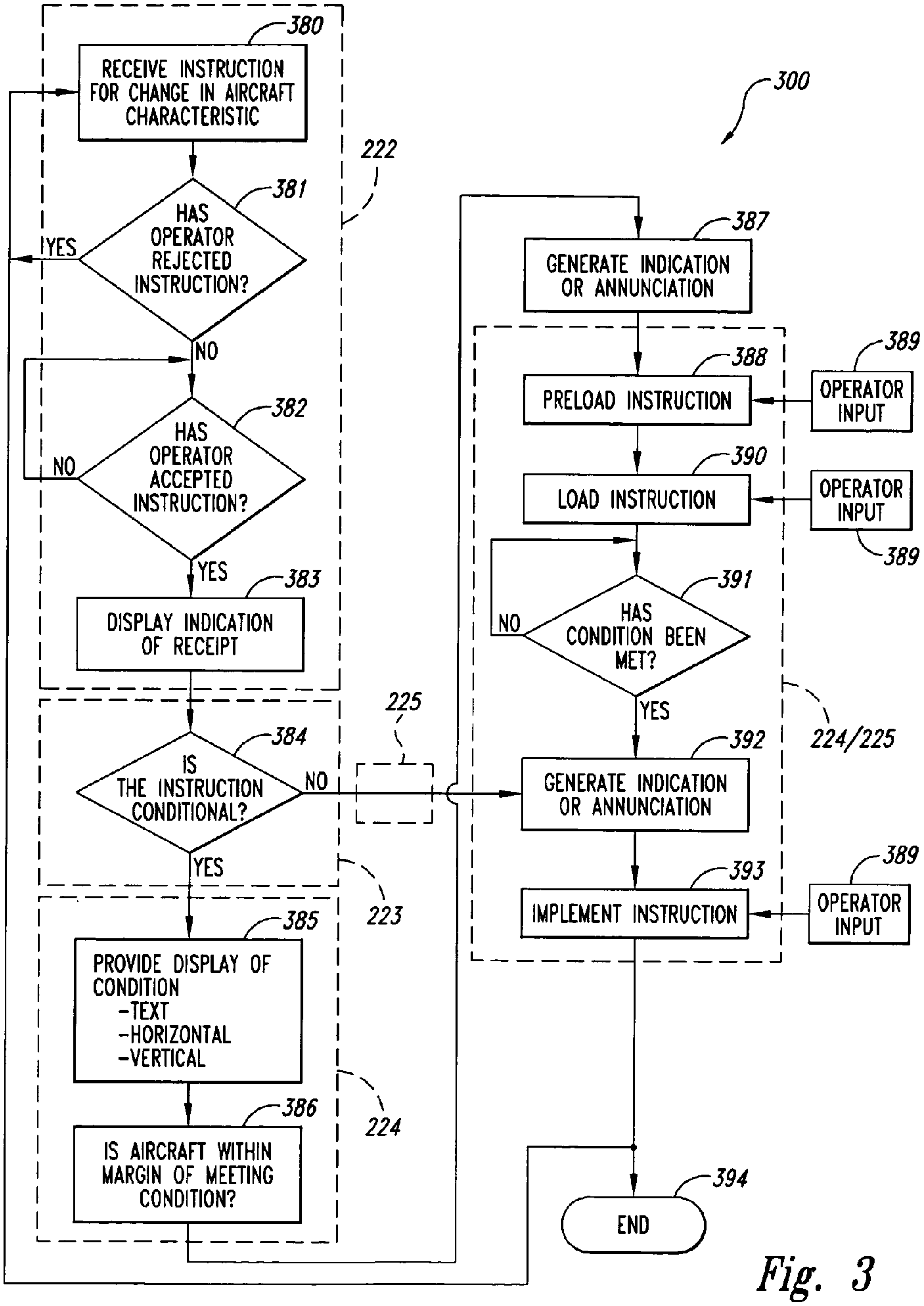
FIG. 3 is a flow diagram illustrating the operation of a system in accordance with an embodiment of the invention.

FIG. 3 is a flow diagram illustrating a process 300 for handling aircraft instructions in accordance with an embodiment of the invention. For purposes of illustration, several of the process steps are shown in FIG. 3 as being associated with the components (e.g., the receiver portion 222 and the conditional instruction handler 224) described above with reference to FIG. 2. In other embodiments, these components can perform more, fewer and/or other process steps than are shown in FIG. 3.

In process portion 380, the process 300 includes receiving instructions corresponding to a requested change in an aircraft characteristic. If the operator rejects the instructions (process portion 381) control returns to step 380. If not, control advances to process portion 382, where it is determined whether or not the operator has accepted the instructions. If the operator accepts the instructions, an indication of receipt can optionally be displayed (process portion 383) and/or transmitted to the source of the instructions (e.g., ATC).

In process portion 384, the nature of the instruction (e.g., whether it is conditional or non-conditional) is determined. If the instruction includes both conditional and non-conditional aspects, each aspect can be handled separately, as described below with reference to FIG. 7C. If the instruction is conditional then in process portion 385, a display of the condition is presented, for example, via a text message, a horizontal display, and/or a vertical display, which are described in greater detail below with reference to FIGS. 5–7C.

The process 300 can then include determining whether or not the aircraft is within a particular margin of meeting the condition (process portion 386). If the aircraft is within the margin, the system 100 can generate an indication or annunciation (process portion 387). For example, if the instruction is to be implemented at a target altitude, the indication can be generated when the aircraft is within a predetermined margin (e.g., 1,000 feet) of the target altitude. If the instruction is to be implemented at a target time, the indication can be displayed when the aircraft is within a predetermined margin (e.g., two minutes) of the target time. If the instruction is to be implemented when the aircraft reaches a target location, the indication can be generated when the aircraft is within a predetermined range (e.g., two nautical miles) of the target location. If the instruction is not a conditional instruction, the non-conditional instruction handler 225 can also direct the generation of an indication immediately or nearly immediately (process portion 392). Accordingly, the operator will receive an indication (a) immediately if the instruction is non-conditional, and (b) prior to meeting a target condition if the instruction is conditional. If the instruction includes more than one condition, portions of the process 300 (e.g., portions 385–391) can be repeated for each condition. Further details of instructions having multiple conditions are described below with reference to FIGS. 7A–7C. In process portion 388, the process 300 includes preloading the instruction, for example, at a display within the aircraft flight deck. This operation can optionally require that the operator provide an input 389 before the instruction is preloaded. In process portion 390, the instruction is loaded, also optionally with operator input 389. Once the instruction has been loaded, it becomes active and the process can then include checking to see whether the condition, which must be fulfilled before the instruction is implemented, has been met (process portion 391). Once the condition has been met, the process 300 can include generating an indication or annunciation (process portion 392).

From this point, conditional and non-conditional instructions can be handled in generally the same manner. Accordingly, in process portion 393, the instruction is implemented, either automatically or with operator input 389. The entire process 300 can then be repeated for each newly received instruction before ending (process portion 394).

Tables 1–3 illustrate exemplary conditional instructions that can be implemented with the systems and methods described above. Each instruction can include a condition portion corresponding to a condition that must be met before a directive portion is implemented. The directive portions of each instruction are indicated in capital letters, with the condition and target indicated in lower case letters. Referring first to Table 1, the instructions can include instructions to change a course, altitude or speed of the aircraft at a selected position or time. As shown in Tables 2 and 3, the instructions can also include requests to change other characteristics or settings of the aircraft. For example, in Table 2, the instruction can include a directive to contact or monitor a particular facility (e.g., ATC facility) or radio frequency at a particular location or time. As shown in Table 3, the instruction can include a request for a report, for example, a request to report the distance to a particular position at a particular time. Table 3 also illustrates conditional instructions that require reporting when a particular position or altitude is attained. In other embodiments, the instructions can have different forms (e.g., multiple conditions, as described below with reference to FIGS. 7A–7C), and/or can correspond to the control of different aircraft characteristics.

TABLE 1

| |
|---|
| AT time CLIMB TO AND MAINTAIN level |
| AT position CLIMB TO AND MAINTAIN level |
| AT time DESCEND TO AND MAINTAIN level |
| AT position DESCEND TO AND MAINTAIN level |
| AT position OFFSET distance direction OF ROUTE |
| AT time OFFSET distance direction OF ROUTE |
| AT time PROCEED DIRECT TO position |
| AT level PROCEED DIRECT TO position |
| AT position FLY HEADING degrees |
| AFTER PASSING position CLIMB TO level |
| AFTER PASSING position DESCEND TO level |
| AFTER PASSING position MAINTAIN speed |

TABLE 2

| |
|---|
| AT position CONTACT unit frequency |
| AT time CONTACT unit frequency |
| AT position MONITOR unit frequency |
| AT time MONITOR unit frequency |

TABLE 3

| |
|---|
| AT time REPORT DISTANCE TO position |
| REPORT PASSING position |
| REPORT LEAVING level |
| REPORT LEVEL level |
| REPORT REACHING level |

Figure 4:
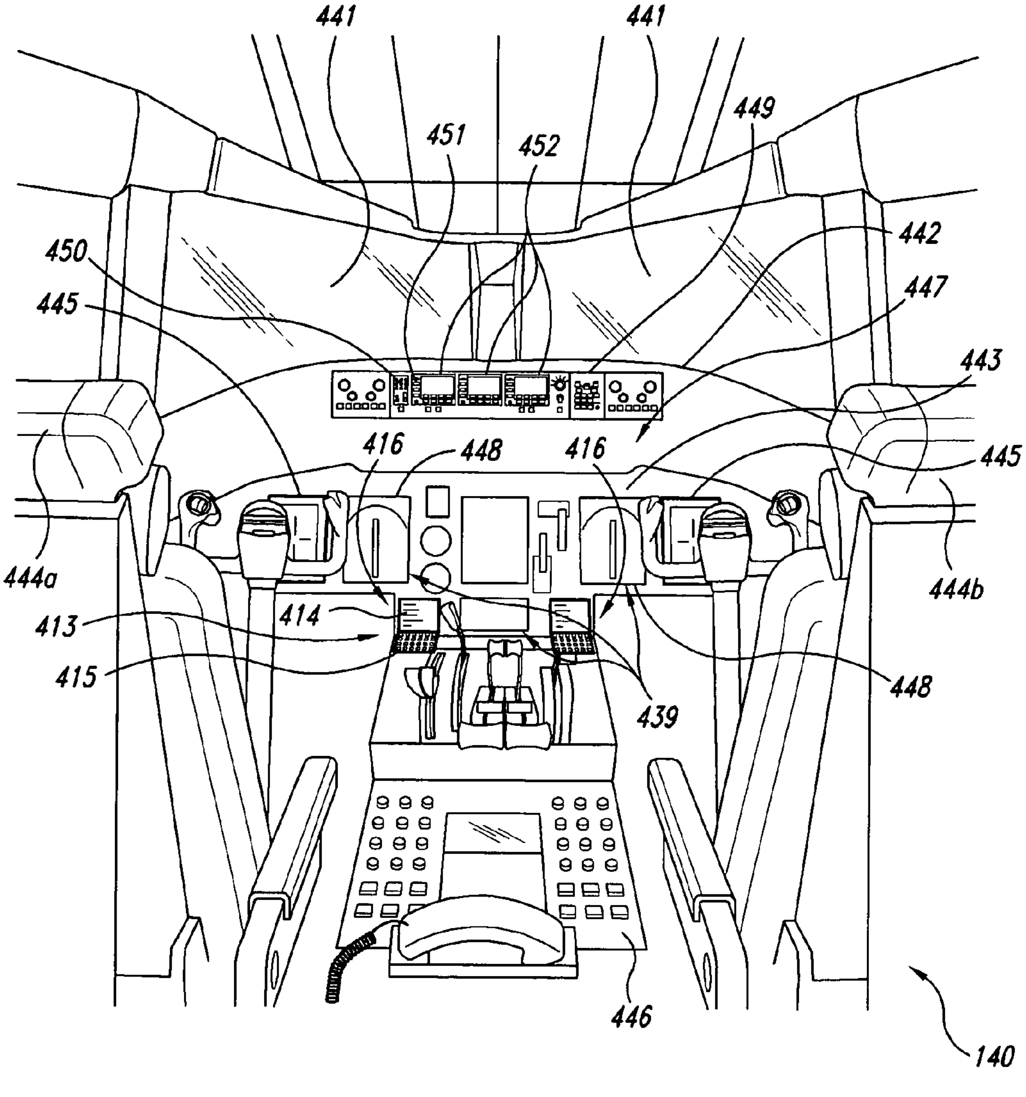
FIG. 4 is a partially schematic, isometric illustration of a flight deck having displays, controls, and instrumentation corresponding to systems and methods in accordance with embodiments of the invention.

FIG. 4 is a partially schematic, forward looking view of the flight deck 140 illustrating the environment in which the instructions described above are received and displayed in accordance with an embodiment of the invention. The flight deck 140 includes forward windows 441 providing a forward field view out of the aircraft 102 (FIG. 1) for operators seated in a first seat 444*a* and/or a second seat 444*b*. In other embodiments, the forward windows 441 can be replaced with one or more external vision screens that include a visual display of the forward field of view out of the aircraft 102. A glare shield 442 can be positioned adjacent to the forward windows 441 to reduce the glare on one or more flight instruments 447 positioned on a control pedestal 446 and a forward instrument panel 443.

The flight instruments 447 can include primary flight displays (PFDs) 445 that provide the operators with actual flight parameter information, and multifunction displays 439, which can in turn include navigation displays 448 that display navigational information. The flight instruments 447 can further include a mode control panel (MCP) 450 having input devices 451 for receiving inputs from the operators, and a plurality of displays 452 for providing flight control information to the operators. The operators can select the type of information displayed on at least some of the displays by manipulating a display select panel 449. Control display units (CDUs) 416 positioned on the control pedestal 446 provide an interface to a flight management computer (FMC) 413. The CDUs 416 include a flight plan list display 414 for displaying information corresponding to upcoming segments of the aircraft flight plan. The flight plan list can also be displayed at one of the MFDs 439 in addition to or in lieu of being displayed at the CDUs 416. The CDUs 416 also include input devices 415 (e.g., alphanumeric keys) that allow the operators to enter information corresponding to the segments. The operators can also enter inputs for the instruction handler 120 described above at the CDUs 416, the MFDs 439 and/or other devices, e.g., the PFDs 445.

Figure 5:
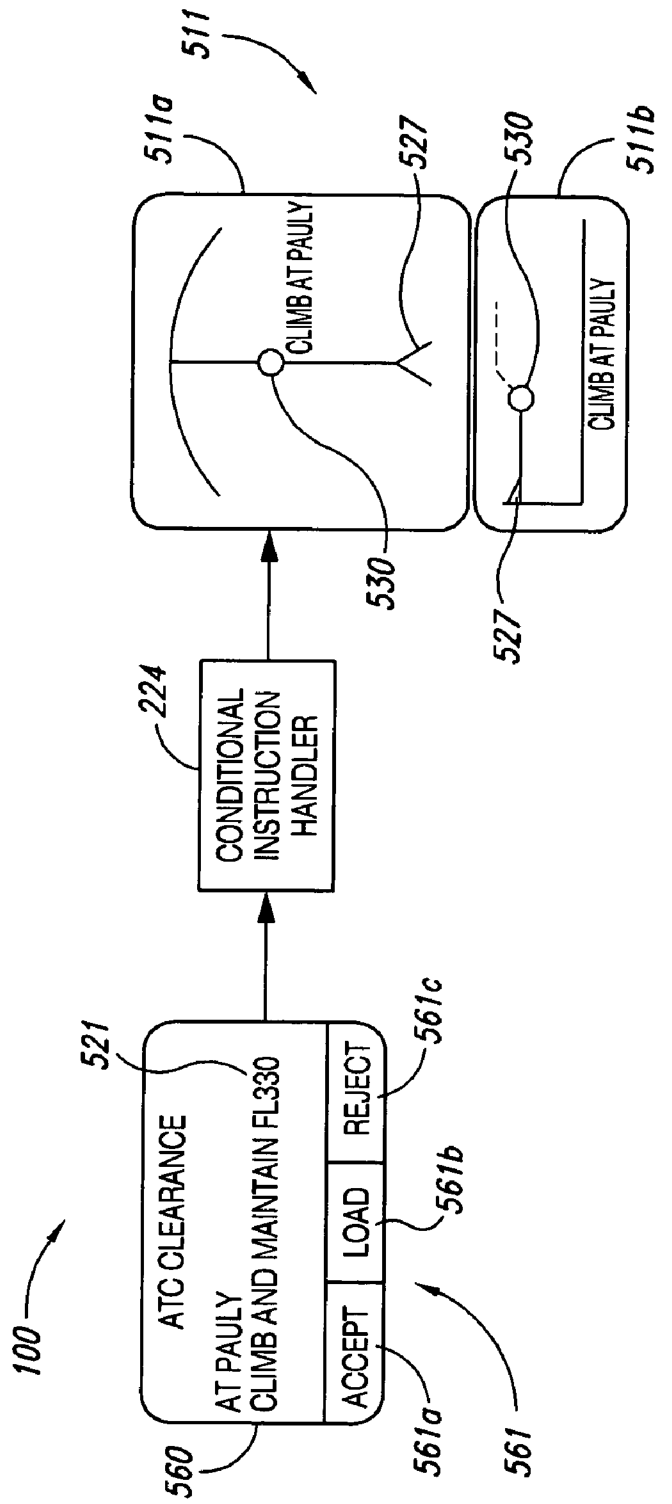
FIG. 5 is a partially schematic illustration of a system and method for displaying conditional instructions in accordance with an embodiment of the invention.

FIG. 5 is a partially schematic illustration of components of the system 100 displaying instruction information in accordance with an embodiment of the invention. The system 100 can include a communications display 560 at which an instruction (e.g., a conditional instruction 521) is displayed. The communication display 560 can be presented at any of the display devices described above or other displays (e.g., side console displays, laptop computer displays and/or electronic flight bag displays). The communication display 560 can also include input selectors 561. For example, the communication display 560 can include a graphical "accept" input selector 561*a*, a graphical "load" input selector 561*b* and a graphical "reject" input selector 561*c* as shown in FIG. 5. The input selectors 561 can have other labels in other embodiments, e.g., the "accept" input selector 561*a* can be labeled "wilco" or "roger" and/or the "reject" input selector 561*c* can be labeled "unable." In other embodiments, the input selectors 561 can include other devices, for example, pushbuttons, cursor control devices and/or voice activation/recognition systems.

The operator can make a selection (e.g., by mouse clicking on one of the input selectors 561) to accept, load or reject the instruction 521. The conditional instruction handler 224 receives the instruction once it has been accepted, and, optionally, displays the instruction in a graphical manner on one or more visual displays 511 (two are shown in FIG. 5 as a horizontal display or map 511*a* and a vertical display 511*b*). The visual displays 511 can include a current indicator 527 (e.g., a pointer) identifying the current aircraft location, and a condition indicator 530 depicting the location at which the condition is expected to be met. The operator can refer to one or both of the visual displays 511*a*, 511*b* to readily determine how far the aircraft is from meeting the condition upon which implementing the instruction is predicated. The information presented by the displays 511*a*, 511*b* can be presented at the navigation displays 448 (FIG. 4) or other display panels, depending on the operator's selection made at the display select panel 449 (FIG. 4). The visual displays 511*a*, 511*b* can be two-dimensional (as shown in FIG. 5) or three-dimensional.

Figure 6:
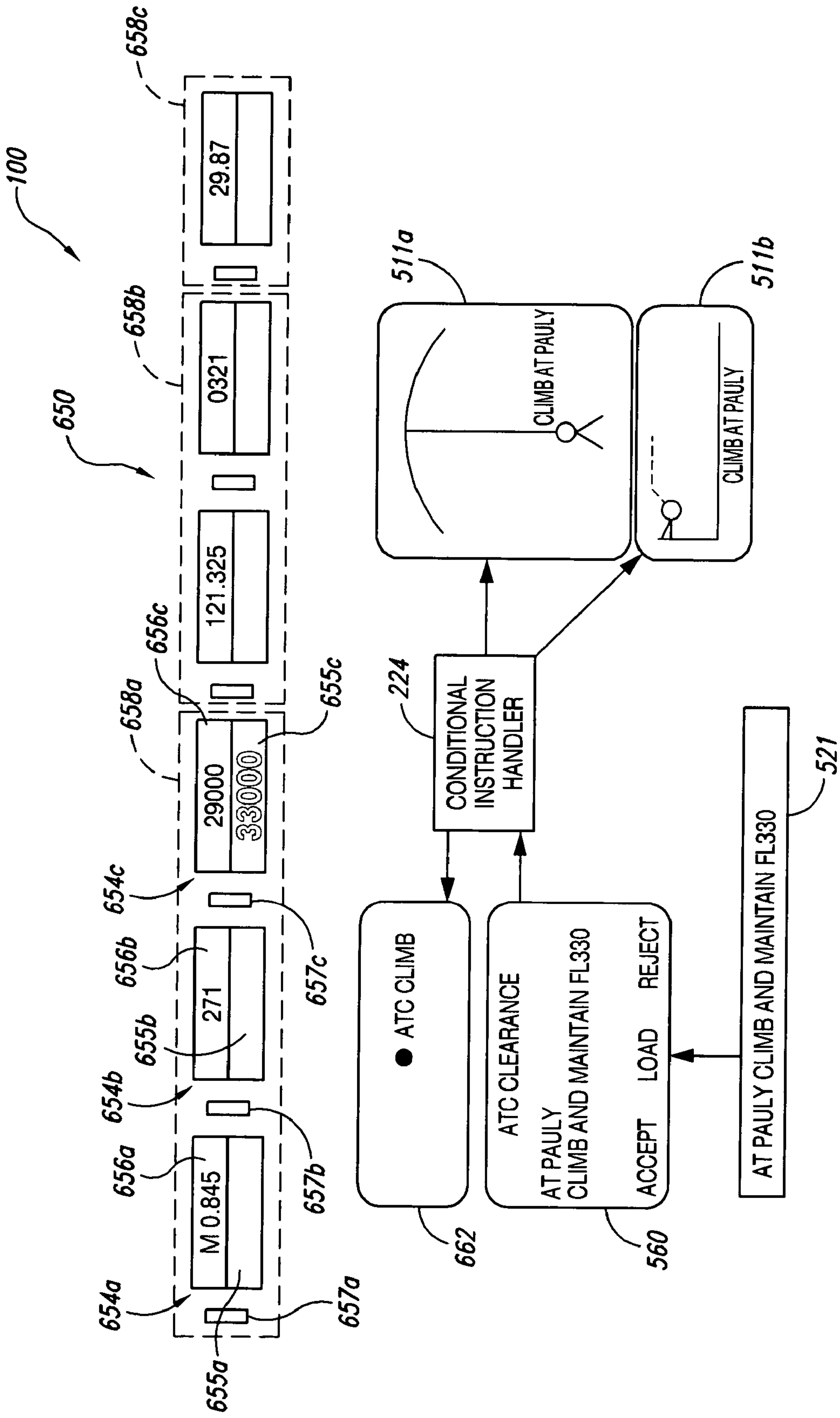
FIG. 6 is a partially schematic illustration of a system including a mode control panel for displaying control information in accordance with an embodiment of the invention.

FIG. 6 illustrates the features described above with reference to FIG. 5, and further illustrates a crew alert display 662 and a mode control panel (MCP) 650. The conditional instruction handler 224 can present a display at the crew alert display 662 (a) prior to the condition being met and/or (b) after the condition is met to let the operator know what instruction the aircraft should be and/or is following. As the aircraft approaches the point at which the condition is expected to be met, the conditional instruction handler 224 can make the condition available for loading at the mode control panel 650 or elsewhere, as described below. The conditional instruction handler 224 can also provide an indication at either or both of the displays 511 (e.g., by changing a color and/or font of the text and/or other identifier presented at the displays 511).

The mode control panel 650 can include an autoflight portion 658*a*, a communications portion 658*b*, and a flight instruments portion 658*c*. The autoflight portion 658*a* can include a speed portion 654*a* (displaying information relating to aircraft speed), a lateral control portion 654*b* (displaying information relating to the lateral control of the aircraft), and a vertical control portion 654*c* (displaying information relating to the vertical control of the aircraft). Each portion 654*a*–654*c* can include an active display 656 (shown as active displays 656*a*–656*c*) and a preview display 655 (shown as preview displays 655*a*–655*c*). The active displays 656 indicate the targets to which the aircraft is currently being controlled, and the preview displays 655 can display an upcoming instruction (e.g., a clearance). Accordingly, the conditional instruction handler 224 can display a clearance limit (e.g., 33,000 feet as shown in FIG. 6) at the preview display 655*c*. The operator can then load the clearance limit into the active display 656*c* by activating a corresponding load switch 657*c*. Load switches 657*a* and 657*b* can provide the same function for airspeed and lateral control instructions. Once the clearance or other instruction is loaded, the aircraft can automatically be controlled to the active limit, or the system 100 can provide visual guidance while the operator flies the aircraft manually to the new target.

Figure 7C:
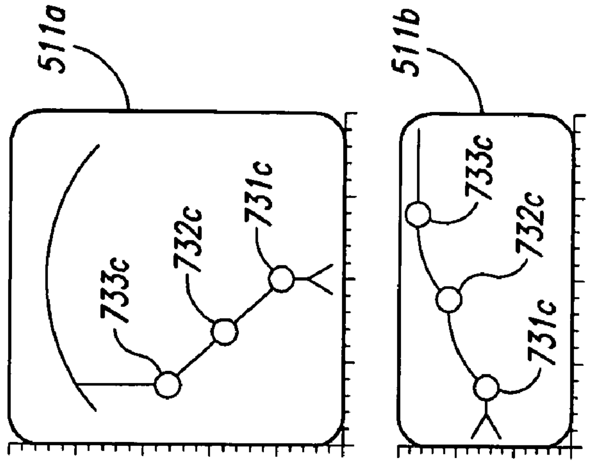
FIGS. 7A–7C illustrate displays presenting multiple conditional information in accordance with still further embodiments of the invention.
Figure 7B:
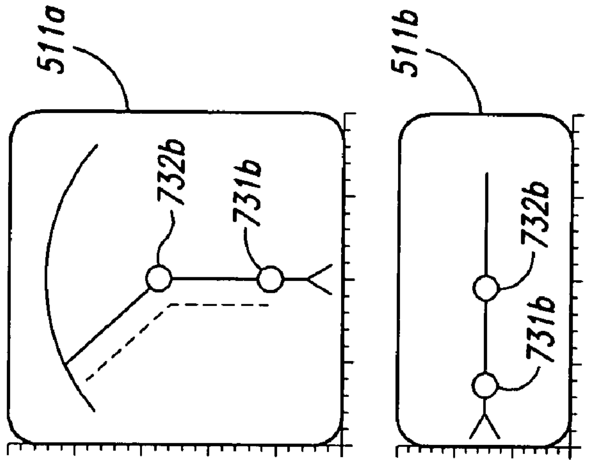
Figure 7A:
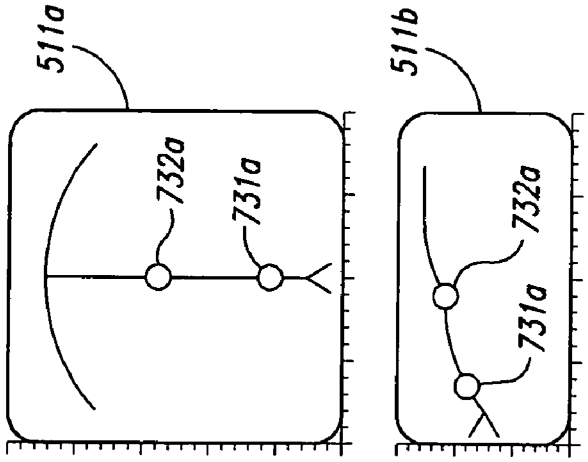

In the embodiments described above, each conditional instruction includes a single condition which, when met, can trigger an indication corresponding to the implementation of a single directive. In other embodiments, the instructions can include more than one condition. For example, as shown in FIG. 7A, the displays 511 can depict multiple, sequential vertical conditions 731*a*, 732*a* aligned along a single heading. This is representative of a stepped climb-out maneuver. As shown in FIG. 7B, the displays 511 can depict multiple, sequential heading conditions 731*b*, 732*b* without corresponding altitude conditions, representative of a heading change during cruise. If applicable, the displays 511 can also show an as-flown offset (shown in dashed lines) along with a pre-planned route (shown in solid lines). As shown in FIG. 7C, the displays 511 can depict course change instructions that are implemented when horizontal and vertical conditions 731*c*, 732*c*, 733*c* are met simultaneously (e.g., a change in both heading and altitude when a position condition and altitude condition are both met). Accordingly, as used herein, the term "multiple conditions" includes without being limited to, (a) a series of conditions such that when each condition is met, a portion of an instruction is implemented, and (b) a plurality of conditions that must be met simultaneously before a given instruction is implemented. In either embodiment, the conditional instruction handler 224 described above can process the instruction, provide the appropriate alert(s) and direct implementation of the instruction.

The non-conditional instruction handler 225 and/or the conditional instruction handler 224 can also process instructions that have both non-conditional and conditional aspects in a manner that removes ambiguity from the instruction. For example, an existing instruction might include:

AT DONER CLIMB TO AND MAINTAIN FL370
INCREASE SPEED TO 0.88

It is not clear whether the speed increase request is to be implemented immediately or after the condition (AT DONER) is met. If the instruction is reworded, the handlers 224 and 225 can each handle the appropriate portion. For example, if the speed increase is to be implemented immediately, the instruction can read:

INCREASE SPEED TO 0.88
THEN
AT DONER CLIMB TO AND MAINTAIN FL370

The non-conditional handler 225 will process the speed increase instruction and the conditional handler 224 will process the altitude change request.

On the other hand, if the speed increase is to be implemented concurrently with the climb, the instruction can read:

AT DONER CLIMB TO AND MAINTAIN FL370
AND
INCREASE SPEED TO 0.88

In this case, the conditional handler 224 will process the entire instruction because the entire instruction is conditioned on meeting a particular condition (AT DONER). As described above with reference to FIG. 3, the discriminator portion 223 can determine which portion of an instruction is conditional and which is not and assign the portions of the instruction to the appropriate handler 224, 225. For example, in a particular embodiment, the discriminator portion 223 can identify certain key words (e.g., "AT" and "AFTER") that signify a conditional instruction. In other embodiments, the discriminator portion 223 can discriminate between conditional and non-conditional instructions in other manners.

One feature of systems in accordance with embodiments described above is that they can distinguish between instructions for a change in a condition of the aircraft (e.g., a flight path direction or change in altitude) that is to be implemented (a) immediately or (b) when a particular condition is met. Accordingly, the system can handle such instructions in different manners to provide the pilot with appropriate notice before and/or when the instruction is to be implemented. An advantage of this feature is that it can be clearer to the operator when the instruction should be implemented and, for automatically implemented instructions, can provide clearer advance notice as to what the instruction will entail.

Another feature of embodiments of systems described above is that they can process instructions that include multiple conditions. Accordingly, such systems can reduce operator confusion which may result when it is unclear whether a given instruction or portion of an instruction is to be implemented immediately and another portion to be implemented conditionally.

Still another feature of systems described above is that they can display in a two-dimensional fashion (e.g., either on a horizontal or vertical display) the location at which the condition is expected to be met. This feature provides the operator with additional advance warning of what action the aircraft will take upon meeting a condition, and how close the aircraft is to meeting the condition.

From the foregoing, it will be appreciated that specific embodiments of the invention have been described herein for purposes of illustration, but that various modifications may be made without deviating from the spirit and scope of the invention. For example, while some of the embodiments described above include particular combinations of features, other embodiments include other combinations of features. Instructions received via a data link or other off-board communication link can be processed automatically in a manner generally similar to that described in co-pending U.S. application Ser. No. 10/798,588, entitled "Methods and Systems for Automatically Displaying Information, Including Air Traffic Control Instructions," filed concurrently herewith and incorporated herein in its entirety by reference. Accordingly, the invention is not limited except as by the appended claims.

We claim:

1. A computer-implemented method for handling incoming aircraft operation instructions, comprising:

receiving from a source off-board an aircraft an instruction for a change in a characteristic of the aircraft during operation;

automatically determining whether or not at least a portion of the instruction is to be implemented once a condition is met;

if at least a portion of the instruction is to be implemented once a condition is met, automatically carrying out a first course of action; and if implementation of at least a portion of the instruction is not predicated upon fulfilling a condition, automatically carrying out a second course of action different than the first course of action.

2. The method of claim 1 wherein carrying out a first course of action includes:

determining what condition must be met before at least a portion of the instruction is to be implemented; and presenting corresponding indication to an operator of the aircraft.

3. The method of claim 1 wherein the instruction includes a condition portion and a directive portion, the condition portion corresponding to a condition that must be met before the directive portion is implemented, and wherein carrying out a first course of action includes:

identifying the condition portion; and presenting corresponding indication to an operator of the aircraft.

4. The method of claim 1 wherein receiving an instruction for a change in a characteristic of the aircraft includes receiving from air traffic control an instruction for a change in a flight path of the aircraft.

5. The method of claim 1 wherein receiving an instruction for a change in a characteristic of the aircraft includes receiving an instruction for changing at least one of a direction, altitude and speed of the aircraft.

6. The method of claim 1 wherein receiving an instruction for a change in a characteristic of the aircraft includes receiving an instruction for simultaneously changing at least two of a direction, altitude and speed of the aircraft.

7. The method of claim 1 wherein receiving an instruction for a change in a characteristic of the aircraft includes receiving an instruction for a change in a radio frequency to which a radio of the aircraft is tuned.

8. The method of claim 1 wherein carrying out the second course of action includes displaying an indication to an operator of the aircraft at least approximately immediately upon determining that implementing at least a portion of the instruction is not predicated upon fulfilling a condition.

9. The method of claim 1 wherein receiving an instruction for a change in a characteristic of the aircraft includes receiving an instruction for changing a characteristic of the aircraft in a first manner when a first condition is met and changing a characteristic of the aircraft in a second manner when a second condition is met.

10. The method of claim 1 wherein receiving an instruction for a change in a characteristic of the aircraft includes receiving an instruction having a first portion to be implemented upon meeting a first condition and a second portion to be implemented upon meeting a second condition.

11. The method of claim 1 wherein receiving an instruction for a change in a characteristic of the aircraft includes receiving an instruction to be implemented when both a first condition and a second condition are met.

12. The method of claim 1 wherein receiving an instruction includes receiving an instruction having a first portion to be implemented once the condition is met and a second portion for which implementation is not predicated upon fulfilling the condition is met, and wherein the method further comprises carrying out the first course of action for the first portion and the second course of action for the second portion.

13. A system for handling incoming aircraft operation instructions, comprising:

a receiver portion configured to receive from a source off-board an aircraft an instruction for a change in a characteristic of the aircraft during operation;

a discriminator portion configured to automatically determine whether or not at least a portion of the instruction is to be implemented once a condition is met;

a conditional instruction handler configured to automatically carry out a first course of action if at least a portion of the instruction is to be implemented once a condition is met; and a non-conditional instruction handler configured to automatically carry out a second course of action different than the first course of action if implementation of at least a portion of the instruction is not predicated upon fulfilling a condition.

14. The system of claim 13 wherein the conditional instruction handler is configured to:

determine what condition must be met before at least a portion of the instruction is to be implemented; and direct the presentation of corresponding indication to an operator of the aircraft.

15. The system of claim 13 wherein the receiver portion is configured to receive an instruction for a change in a flight path of the aircraft from air traffic control.

16. The system of claim 13 wherein the receiver portion is configured to receive an instruction for a change in a radio frequency to which a radio of the aircraft is tuned.

17. The system of claim 13 wherein the non-conditional instruction handler is configured to direct a presentation of an indication to an operator of the aircraft at least approximately immediately upon determining that the instruction is not predicated upon fulfilling a condition.

18. The system of claim 13, further comprising the aircraft, and wherein the aircraft includes a flight deck positioned to house the operator.

19. A computer-implemented method for handling incoming aircraft operation instructions, comprising receiving from a source off-board the aircraft an instruction for a change in a characteristic of the aircraft during operation; and if at least a portion of the instruction is to be implemented once a condition is met, directing an indication to an operator of the aircraft.

20. The method of claim 19, further comprising automatically determining whether or not the instruction is to be implemented once a condition is met.

21. The method of claim 19, further comprising displaying the indication to the operator.

22. The method of claim 19, further comprising displaying a textual indication message to the operator.

23. The method of claim 19 wherein receiving an instruction for a change in a characteristic of the aircraft includes receiving an instruction having a first portion to be implemented upon meeting a first condition and a second portion to be implemented upon meeting a second condition, and wherein directing an alert includes directing a first indication proximate to a time before the first condition is met, or after the first condition is met, or both before and after the first condition is met, and directing a second indication before the second condition is met, or after the second condition is met, or both before and after the second condition is met.

24. The method of claim 19 wherein receiving an instruction for a change in a characteristic of the aircraft includes receiving an instruction to be implemented when both a first condition and a second condition are met.

25. A system for handling incoming aircraft operation instructions, comprising:

a receiver portion configured to receive from a source off-board the aircraft an instruction for a change in a characteristic of the aircraft during operation; and an indicating portion configured to direct an indication to an operator of the aircraft if the instruction is to be implemented once a condition is met.

26. The system of claim 25, further comprising a discriminator portion configured to determine whether or not the instruction is to be implemented once a condition is met.

27. The system of claim 25 wherein the receiver portion is configured to receive an instruction that includes a first portion to be implemented upon meeting a first condition and a second portion to be implemented upon meeting a second condition, and wherein the indicating portion is configured to direct a first indication before, or after, or both before and after the first condition is met, and direct a second indication before, or after, or both before and after the second condition is met.

28. The system of claim 25, further comprising the aircraft, and wherein the aircraft includes a flight deck positioned to house the operator, and wherein the altering system includes an alerting device positioned at the flight deck.

29. A computer-implemented method for displaying information corresponding to incoming aircraft operation instructions, comprising:

receiving from a source off-board the aircraft an instruction for a change in a characteristic of the aircraft during operation, the instruction to be implemented once a condition is met; and displaying at a single display location an at least two-dimensional indication of the location of the aircraft and a location at which the condition is expected to be met.

30. The method of claim 29 wherein displaying an at least two-dimensional indication includes displaying an indication of the altitude of the aircraft relative to a first axis, and displaying an indication of a distance relative to a second axis transverse to the first axis.

31. The method of claim 29 wherein displaying an at least two-dimensional indication includes displaying an indication of the aircraft's location relative to two transverse lateral axes.

32. The method of claim 29 wherein displaying a location at which the condition is expected to be met includes displaying a textual indication of an upcoming change in a flight path of the aircraft.

33. The method of claim 29 wherein displaying a location at which the condition is expected to be met includes displaying a graphical indication of the upcoming change in a flight path of the aircraft.

34. A system for displaying information corresponding to incoming aircraft operation instructions, comprising:

a receiver portion configured to receive from a source off-board the aircraft an instruction for a change in a characteristic of the aircraft during operation, the instruction to be implemented once a condition is met;

a display portion configured to display at a single display location an at least two-dimensional indication of the location of the aircraft and a location at which the condition is expected to be met; and a processor portion operatively coupled to the receiver portion and the display portion to transmit signals to the display portion corresponding to the at least two-dimensional indication of the location of the aircraft and the location at which the condition is expected to be met.

35. The system of claim 34 wherein the processor portion is configured to transmit signals corresponding to an indication of the altitude of the aircraft relative to a first axis, and an indication of a distance traveled by the aircraft relative to a second axis transverse to the first axis.

36. The system of claim 34 wherein the processor portion is configured to transmit signals corresponding to an indication of the aircraft's location relative to two transverse lateral axes.

37. The system of claim 34 wherein the processor portion is configured to transmit signals corresponding to a textual indication of an upcoming change in a flight path of the aircraft.

38. The system of claim 34 wherein the processor portion is configured to transmit signals corresponding to a graphical indication of the upcoming change in a flight path of the aircraft.

39. The method of claim 19 wherein directing an indication to an operator of the aircraft includes directing an indication before the condition is met.

40. The method of claim 19 wherein directing an indication to an operator of the aircraft includes directing an indication after the condition is met.

41. The system of claim 25 wherein the indicating portion is configured to direct the indication to the operator before the condition is met.

42. The system of claim 25 wherein the indicating portion is configured to direct the indication to the operator after the condition is met.

* * * * *

UNITED STATES PATENT AND TRADEMARK OFFICE

CERTIFICATE OF CORRECTION

PATENT NO. : 7,177,731 B2
APPLICATION NO. : 10/798749
DATED : February 13, 2007
INVENTOR(S) : Sandell et al.

It is certified that error appears in the above-identified patent and that said Letters Patent is hereby corrected as shown below:

Column 5
Line 2, "handier" should be --handler--;

Signed and Sealed this

Seventeenth Day of April, 2007

JON W. DUDAS
*Director of the United States Patent and Trademark Office*